UNITED STATES PATENT OFFICE.

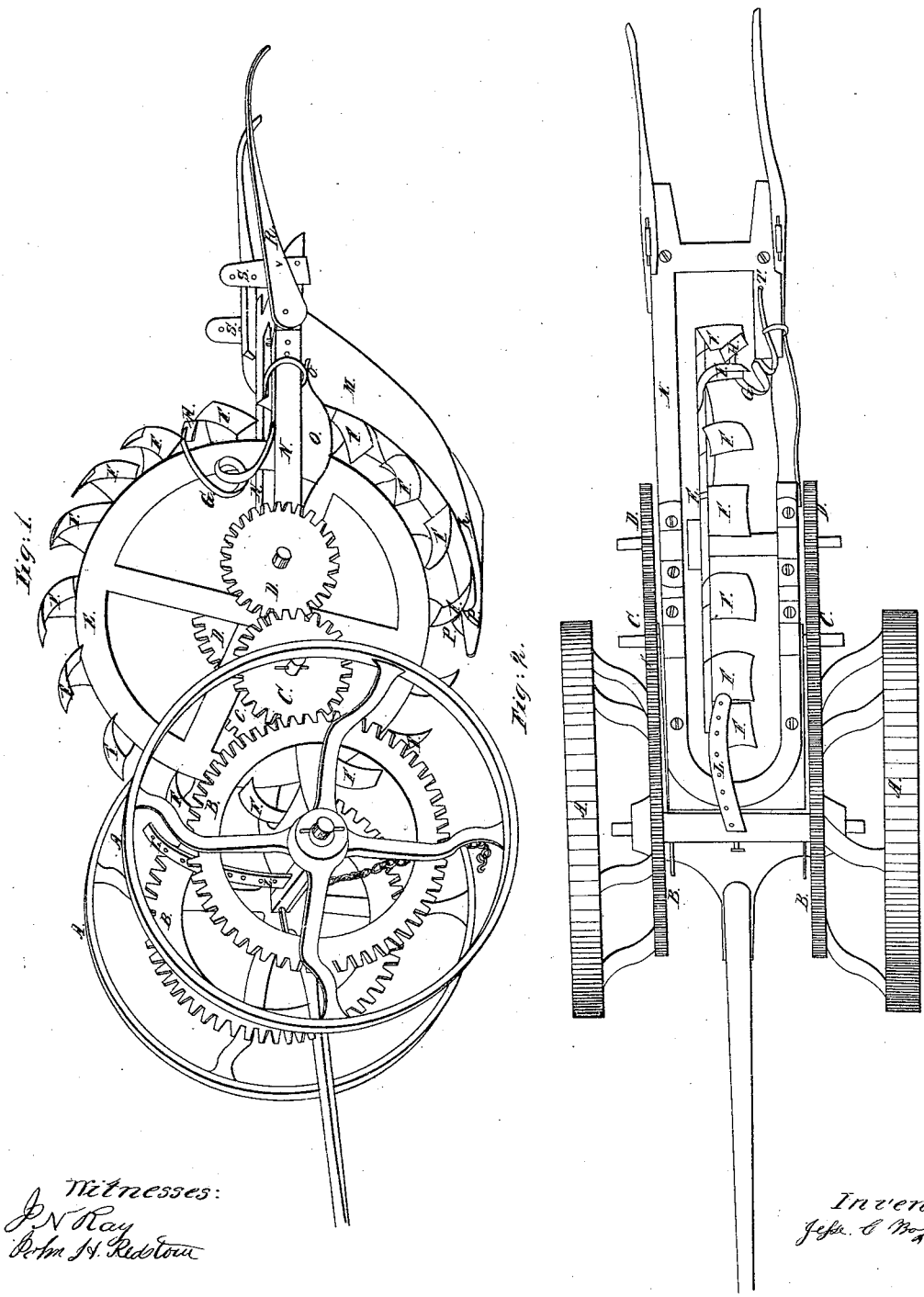

JESSE C. BOYD, OF RUSHVILLE, INDIANA.

IMPROVED DITCHING-MACHINE.

Specification forming part of Letters Patent No. 53,264, dated March 20, 1866.

*To all whom it may concern:*

Be it known that I, JESSE C. BOYD, of Rushville, in the county of Rush and State of Indiana, have invented certain new and useful Improvements in Ditching-Machines; and I do hereby declare that the following is a full, clear, and exact description, reference being had to the accompanying drawings and the letters marked thereon.

Figure 1 is a perspective view, in which A is the master-wheel; B, a cog-rim upon the same, which gears with the wheel C and gives motion to the spading-wheel E by means of the wheel D, which is upon the same shaft. F, &c., are spades or cutters, which are designed to lift the dirt as it is cut by the point-cutter and plow K with cutters P. The handles R R are adjusted by raising or lowering upon the uprights s s. The spring G holds the scraper H, which is designed to clear the spades or cutters F.

Following is the operation of the machine: As the same is moved forward the traction-wheels A give motion to the spade-wheel by means of the cog-rim B, which gears with the wheel C and D. The soil is cut and the ditch formed by the plow and cutters P P, when the dirt is carried up in the chute M, which is attached to the frame N, and is made to conform to the curve through which the spades or cutters pass. The frame N has the curved connecting-bar L, so constructed as to hold the axis of the master-wheels A equally distant from the cog-rim B, and in gear, while the frame N is raised or lowered. The curved connecting-bar L is so formed as to correspond with the arc of a circle whose radius is equal to the distance which it is placed from the axis of the ditching-wheel E, and is so attached that the bar L stands concentrically with the axis of the ditching or spading wheel E, and the bar L, running through a mortise at the center of the axis of the main driving and gear wheels, insures the keeping in gear of the wheels B and C, as before alluded to. In addition to the curved bar L the axis of the traction-wheels A is also connected by bars extending to the axis of the wheels C. By this arrangement the plows may be set so as to cut to a greater or less depth without disarranging the gear, and thereby stopping or affecting the motion of the spades F. The spades F are so formed as to lift the dirt freely from the chute or guard M. The scraper H, attached to the spring G, may be so arranged that it will scrape the face of each of the shovels F as they pass up, thereby throwing the dirt upon the apron O, which shoots it out by the side of the machine. The spring G may be thrown out when the soil is loose and it is not needed by unclamping it at $s'$ and turning it upon the hinge or pivot T, so that in loose or sandy soil it may be drawn away from the spades, and when the soil is sticky it may be again placed in position to scrape the cutters or spades F.

What I claim as new is—

The spading-wheel E, arranged to operate in the frame N, in connection with the plow K, having the cutters P and chute M, when the same are connected with the axle of the traction-wheels A by means of the curved bar L, and operated by the cog-rim B and wheels C and D, substantially in the manner and for the purposes set forth.

JESSE C. BOYD.

Witnesses:
J. W. BROWN, Jr.,
WILLIAM CHURCHILL.